(12) United States Patent
Fujiwara et al.

(10) Patent No.: US 7,567,539 B2
(45) Date of Patent: Jul. 28, 2009

(54) WIRELESS LAN SYSTEM, COMMUNICATION TERMINAL, LAN CONTROL APPARATUS AND QOS CONTROL METHOD

(75) Inventors: Hidehiko Fujiwara, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 994 days.

(21) Appl. No.: 10/702,775

(22) Filed: Nov. 7, 2003

(65) Prior Publication Data

US 2004/0105415 A1    Jun. 3, 2004

(30) Foreign Application Priority Data

Nov. 29, 2002    (JP)    ............................. 2002-348070

(51) Int. Cl.
*H04Q 7/24*    (2006.01)
(52) U.S. Cl. ................. 370/338; 370/395.21
(58) Field of Classification Search .................. 370/235
See application file for complete search history.

(56) References Cited

U.S. PATENT DOCUMENTS

| | | | |
|---|---|---|---|
| 6,747,968 B1* | 6/2004 | Seppala et al. ............. | 370/338 |
| 6,868,446 B2* | 3/2005 | Hattori et al. ............. | 709/224 |
| 7,185,112 B1* | 2/2007 | Kuranari et al. ............ | 709/249 |
| 7,224,679 B2* | 5/2007 | Solomon et al. ........... | 370/338 |
| 2002/0143911 A1* | 10/2002 | Vicente et al. ............. | 709/223 |
| 2003/0081583 A1* | 5/2003 | Kowalski .................... | 370/338 |
| 2004/0042435 A1* | 3/2004 | Soomro et al. ............. | 370/338 |
| 2004/0054766 A1* | 3/2004 | Vicente ...................... | 703/223 |
| 2004/0085922 A1* | 5/2004 | Herle ......................... | 370/328 |

FOREIGN PATENT DOCUMENTS

| | | |
|---|---|---|
| JP | 7-15455 | 1/1995 |
| JP | 10-79740 | 3/1998 |
| JP | 11-122288 | 4/1999 |
| JP | 11-178076 | 7/1999 |
| JP | 11-313080 | 11/1999 |
| JP | 2000-253018 | 9/2000 |
| JP | 2000-324170 | 11/2000 |

(Continued)

*Primary Examiner*—Gregory B Sefcheck
*Assistant Examiner*—Suk Jin Kang
(74) *Attorney, Agent, or Firm*—Dickstein Shapiro LLP (57) ABSTRACT

Disclosed is a wireless LAN (Local Area Network) system which overcomes a troublesome operation and process of setting QoS needed for each LAN at the time of using various LANs in a home, an office, countless Hotspots and so forth. The wireless LAN system has a terminal and LAN control section. The terminal has a QoS (Quality of Service) analyzing/setting section which requests of the LAN control section for a QoS management table as a QoS policy to manage QoS of communication data at the time of establishing connection to a wireless LAN, analyzes the table sent from the LAN control section in response to the request, sets QoS setting data based on the result of that analysis, and sends the data to the LAN control section. The LAN control section has a QoS setting DB (Data Base) which holds the table in an updatable manner, and a QoS communication control section which sends the table in response to the request from the terminal, updates the QoS setting data from the communication terminal on the table, and executes QoS control on the communication data with the communication terminal in accordance with the QoS policy.

6 Claims, 6 Drawing Sheets

FOREIGN PATENT DOCUMENTS

| JP | 2000-341343 | 12/2000 |
| JP | 2001-94566 | 4/2001 |
| JP | 2001-94605 | 4/2001 |
| JP | 2001-156838 | 6/2001 |
| JP | 2001-345865 | 12/2001 |
| JP | 2002-135276 | 5/2002 |
| JP | 2002-176435 | 6/2002 |

* cited by examiner

EXAMPLE OF QoS MANAGEMENT TABLE (QoS POLICY)

| USER | QoS ENABL-ENESS | TYPE | USED APPLICATION | QoS COMPRE-SSION RATE | RTP | SECURITY | ACCOUNT SETTING | OTHER |
|---|---|---|---|---|---|---|---|---|
| User 001 | Enable | | BOTH VOICE AND DATA | HIGH | | Enable | Password | — |
| User 002 | Enable | | ONLY DATA | — | — | Enable | Password | — |
| User 003 | Disable | — | — | — | — | Enable | Password | — |
| .. | .. | .. | .. | .. | .. | .. | .. | .. |
| .. | .. | .. | .. | .. | .. | .. | .. | .. |

PRIORITY

PRIORITY・COMPRESSION

QoS UNCOMPLIANT

QoS COMPLIANT

WIRELESS LAN SYSTEM, COMMUNICATION TERMINAL, LAN CONTROL APPARATUS AND QOS CONTROL METHOD

BACKGROUND OF THE INVENTION

1. Field of the Invention

The present invention relates to a wireless LAN (Local Area Network) system, a communication terminal, a LAN control apparatus and QoS (Quality of Service) control method, and, more particularly, to techniques for QoS setting and renewal which should be carried out on a terminal side to be connected to a wireless LAN and for QoS control.

2. Description of the Related Art

With an increase in the usage of communication networks typified by the Internet, a LAN environment that supports communication networks are expanding to various areas including the ordinary usages in offices and homes. In predetermined public areas such as a cafe and hotels, particularly, a wireless LAN connection service called "Hotspot" (registered trademark) using IEEE802.11b (the standard for a wireless LAN using 2.4-GHz band) and IEEE802.11a (the standard for a wireless LAN using 5.2-GHz band) (hereinafter simply called "Hotspot") has already started.

A user who receives a wireless LAN service typified by such a Hotspot establishes connection to an access point (called "parent device" or simply "parent") sited in a public area using a notebook type PC (Personal Computer), PDA (Personal Digital Assistant) or the like equipped with a wireless LAN terminal (called "child device" or simply "child") and can communicate with another communication network such as the Internet through the access point.

One possible case of using LAN environments over an office, a home and various public areas is that a user, such as a business person who mainly works in suburbs always carrying around a business terminal, such as a notebook type PC or PDA, connectable to a wireless LAN uses an office LAN in an office, a domestic LAN in a home and countless Hotspots in fields using the business terminal.

In the mentioned case, the LAN environments which are used by a single terminal are not limited to an office and a home, but extend to various other areas, such as countless Hotspots. In this case, a user needs to set a LAN environment for each LAN, so that as the number of LANs increases, the operation and process become more complicated. This problem becomes noticeable particularly in such a case where a QoS to guarantee the quality of communication of communication data is set.

With regard to QoS setting in such a communication network like LAN, there have been proposed a networks connecting apparatus which guarantees the optimal QoS at the time of connecting a LAN and ATM (Asynchronous Transfer Mode) network together (see JP-A-2000-341343) and a LAN switch which performs such control as to separate a communication traffic to a control packet and a data packet, classify the communication traffic for each QoS setting, extract the control packet before executing priority control and treat it in the same way as a data packet traffic with the highest priority (see JP-A-2001-094605).

However, the conventional techniques described in JP-A-2000-341343 and JP-A-2001-094605 are not necessarily premised on the use of multifarious LAN environments over various areas using a single terminal as mentioned in the above-described case, and do not overcome the problem arising from the manual setting of LAN environments including the QoS setting.

Particularly, in case that a user moves to a LAN with a different QoS policy, the user cannot receive benefit of the QoS unless the user check the QoS setting of the LAN at the destination beforehand. Further, as there are different QoS settings in various LANs which are used in a home, an office, countless Hotspots and so forth, the settings cannot be managed automatically. Because there are different security settings and account settings in such various LANs, those settings cannot be managed automatically as in the case of the QoS settings.

SUMMARY OF THE INVENTION

The present invention has been devised in consideration of the above-described situations and aims at providing a wireless LAN system which can overcome a troublesome operation and process of setting QoS needed for each LAN at the time of using LANs over various areas, such as a home, an office, and a public area where countless wireless LAN connection services can be used.

To achieve the object, according to one aspect of the invention, there is provided a wireless LAN (Local Area Network) system having a communication terminal connectable to a wireless LAN and a LAN control apparatus to be connected to the communication terminal via the wireless LAN in such a manner as to be able to exchange communication data with the communication terminal. In the wireless LAN system, the communication terminal includes policy request means which requests of the LAN control apparatus for a QoS (Quality of Service) management table as a QoS policy to manage QoS of the communication data at a time of establishing connection to the wireless LAN, analyzing/setting means which analyzes the QoS management table sent from the LAN control apparatus in response to a request made by the policy request means and sets QoS setting data of the communication terminal in an updatable manner based on a result of that analysis, and setting-data transmission means which sends the QoS setting data, set by the analyzing/setting means, to the LAN control apparatus, and the LAN control apparatus includes table holding means which holds the QoS management table in an updatable manner, table transmission means which sends the QoS management table in response to the request from the communication terminal, policy reconstruction means which updates the QoS setting data, sent from the communication terminal, on the QoS management table to reconstruct the QoS policy, and QoS control means which executes QoS control on the communication data with the communication terminal in accordance with the QoS policy which is determined by the QoS management table.

According to this aspect, the LAN control apparatus may further include means which spontaneously distributes the QoS management table as the reconstructed QoS policy to every communication terminal connected to the wireless LAN, and the communication terminal may further include means which changes the QoS setting data, set by the analyzing/setting means, based on the QoS management table spontaneously distributed from the LAN control apparatus.

According to another aspect of the invention, there is provided a communication terminal in a wireless LAN (Local Area Network) system, which is connected to a LAN control apparatus via a wireless LAN in such a manner as to be able to exchange communication data with the communication terminal, and comprises policy request means which requests of the LAN control apparatus for a QoS (Quality of Service) management table as a QoS policy to manage QoS of the communication data at a time of establishing connection to the wireless LAN; analyzing/setting means which analyzes the QoS management table sent from the LAN control apparatus in response to a request made by the policy request means and sets QoS setting data of the communication terminal in an updatable manner based on a result of that analysis; and setting-data transmission means which sends the QoS setting data, set by the analyzing/setting means, to the LAN control apparatus. The communication terminal according to this aspect may further comprise means which changes the QoS setting data, set by the analyzing/setting means, based on the QoS management table spontaneously distributed from the LAN control apparatus.

According to a further aspect of the invention, there is provided a LAN (Local Area Network) control apparatus in a wireless LAN system, which is connected to a communication terminal via a wireless LAN in such a manner as to be able to exchange communication data with the communication terminal and comprises table holding means which holds a QoS (Quality of Service) management table in an updatable manner as a QoS policy to manage QoS of the communication data; table transmission means which sends the QoS management table in response to a request from the communication terminal; policy reconstruction means which updates QoS setting data, sent from the communication terminal in response to the table transmission means and set through analysis on the QoS management table, to reconstruct the QoS policy; and QoS control means which executes QoS control on the communication data with the communication terminal in accordance with the QoS policy which is determined by the QoS management table. The LAN control apparatus according to this aspect may further comprising means which spontaneously distributes the QoS management table as the reconstructed QoS policy to every communication terminal connected to the wireless LAN.

According to a still further aspect of the invention, there is provided a QoS (Quality of Service) control method for a wireless LAN (Local Area Network) system having a communication terminal connectable to a wireless LAN and a LAN control apparatus to be connected to the communication terminal via the wireless LAN in such a manner as to be able to exchange communication data with the communication terminal. The method comprises the steps of causing the LAN control apparatus to hold a QoS management table in an updatable manner as a QoS policy to manage QoS of the communication data; causing the communication terminal to request of the LAN control apparatus for the QoS management table at a time of establishing connection to the wireless LAN; causing the LAN control apparatus to send the QoS management table in response to a request from the communication terminal; causing the communication terminal to analyze the QoS management table sent from the LAN control apparatus in response to the request and set QoS setting data of the communication terminal in an updatable manner based on a result of that analysis; causing the communication terminal to send the set QoS setting data to the LAN control apparatus; causing the LAN control apparatus to update the QoS setting data, sent from the communication terminal, on the QoS management table to reconstruct the QoS policy; and causing the LAN control apparatus to execute QoS control on the communication data with the communication terminal in accordance with the QoS policy which is determined by the QoS management table.

The QoS control method according to this aspect may further comprise the steps of causing the LAN control apparatus to spontaneously distribute the QoS management table as the reconstructed QoS policy to every communication terminal connected to the wireless LAN; and causing the communication terminal to change the QoS setting data based on the QoS management table spontaneously distributed from the LAN control apparatus.

The term "QoS" (also called "QoS service") or "QoS control" used in the specification is a technique for effectively using the communication capacities of limited communication channels (wired LAN, wireless LAN, etc.) by performing "compression", "priority/non-priority process" and so forth on communication data. For instance, one example of the "priority/non-priority process" that is executed by the "QoS" or "QoS control" is a process which controls the priority order of data distribution at a location where the communication capacity becomes narrow or a bottleneck based on the priority order given to data packets (wireless LANs) and prevents discarding of data with a high priority as much as possible.

To increase the effect of the "QoS" or "QoS control", it is necessary to give a priority order well-balanced over the entire system, thus requiring a "QoS policy" to manage the overall QoS control based on a priority which should be given to each user beforehand. A "QoS management table" is used as this "QoS policy". The "QoS management table" manages information specifying what kind of QoS a user uses and personal data (security setting and account setting).

BRIEF DESCRIPTION OF THE DRAWINGS

FIGS. 3A and 3B are explanatory diagrams for exemplifying QoS control done by a QoS communication control section, FIG. 3A showing a case where a priority/non-priority process is not performed while FIG. 3B shows a case where a priority/non-priority process is performed;

DETAILED DESCRIPTION OF THE PREFERRED EMBODIMENTS

Preferred embodiments of a wireless LAN system, a communication terminal, a LAN control apparatus and a QoS control method according to the invention will be described below with reference to FIGS. 1 to 6.

Figure 1:
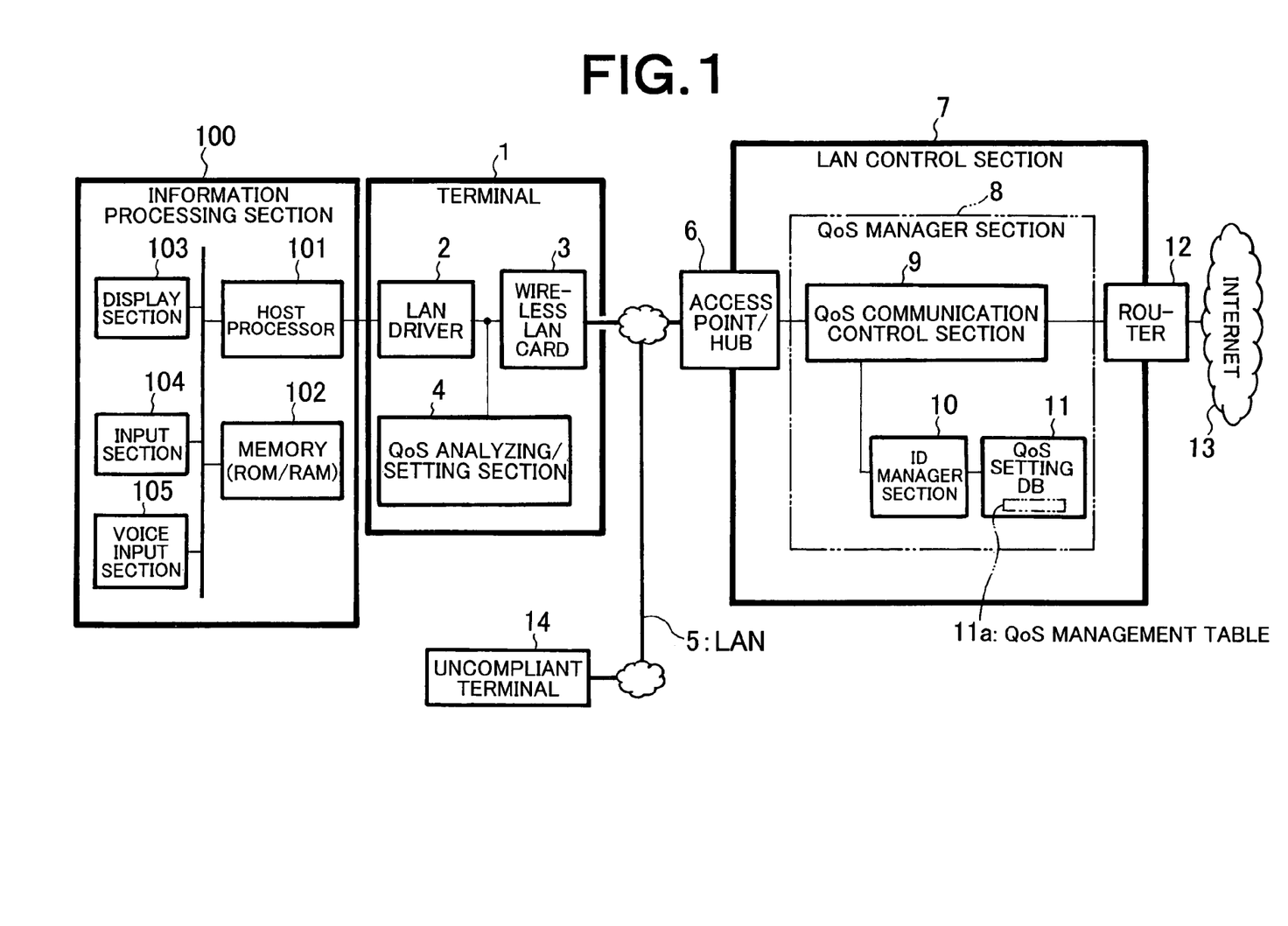
FIG. 1 is a schematic block diagram showing the general structure of a wireless LAN system having a QoS control capability according to the invention.

FIG. 1 shows a schematic diagram of the general structure of a wireless LAN system according to this embodiment. The wireless LAN system shown in FIG. 1 is configured by an "infrastructure network" where, for example, a wireless network and other networks exist and which is included in, for example, the system configurations defined in IEEE (Institute of Electrical and Electronics Engineers, Inc.) 802.11 that is the wireless LAN standard, and can communicate with a network such as the Internet, via an access point or a node to a wireless network. In this infrastructure network, an access point is also called "parent" and a wireless LAN terminal "child" based on the parent-child relationship in communications.

In the example shown in FIG. 1, the wireless LAN system has a terminal (which constitutes a communication terminal according to the invention) 1 equipped with the capability a wireless LAN terminal (child) corresponding to QoS (QoS service) and a LAN control section (which constitutes a LAN control apparatus according to the invention) 7 including an access point (parent) for a wireless LAN which is connected to the terminal 1 in a communicatable manner via a LAN 5 such as the Ethernet (registered trademark). In the example shown in FIG. 1, a terminal equipped with the capability of a wireless LAN terminal (child) 14 which is not compliant with a QoS (hereafter called "uncompliant terminal" for the sake of descriptive convenience) as well as the terminal 1 is connected to the LAN 5.

The terminal 1 is comprised of a portable communication terminal such as a PDA which can be equipped with a wireless LAN terminal conforming to, for example, the standard (IEEE802.11b, IEEE802.11a or the like) or a portable electronic device, such as a notebook type PC, a portable telephone or a PHS (Personal Handyphone System). The terminal 1 has a LAN driver 2 which controls the communication operation through LAN connection, a wireless LAN card 20 (e.g., a card type wireless LAN terminal equipped with known functional sections, such as a communication antenna, power amplifier, RF-IF converter, IF modem, baseband processor, and media access controller (MAC) from the view point of the hardware structure) 3 and a QoS analyzing/setting section (which constitutes the essential portions of the policy request means, analyzing/setting means and setting-data transmission means of the communication terminal in a wireless LAN system according to the invention and their corresponding steps) 4. The terminal 1 is connected to the LAN 5 via the wireless LAN card 3 in a communicatable manner. Instead of the wireless LAN card 3, an adapter type wireless LAN terminal may be used as the wireless LAN interface.

Of the aforementioned components, the QoS analyzing/setting section 4 is constituted by, for example, a microcomputer having a CPU and memory. As the CPU executes a program based on an analysis algorithm preset on the memory, it executes various processes such as a process of making analysis on the QoS setting for every user based on a QoS management table sent from the LAN control section 7 via the wireless LAN card 3 as a QoS policy to be discussed later and doing the optimal QoS setting based on the result of the analysis, and a process of changing the QoS setting (e.g., a QoS compression rate to be discussed later) in accordance with the compliant/uncompliant connection state of another terminal which is added by later logging-in to the LAN 5.

The terminal 1 is provided integrally with an information processing section 100 in, for example, its electronic device body or as a separate unit. The information processing section 100 comprises a host processor (CPU) 101 to be connected to the LAN driver 2, a memory (ROM/RAM) 102 to be connected to the host processor 101 via an internal bus, a display section (liquid crystal display or the like) 103, an input section (each of various input devices, such as a keyboard, pointing device, operation switches, operation buttons and operation keys) 104 and a voice input section (microphone and speaker) 105. The structure of the uncompliant terminal 14 is the same as the structure of the terminal 1 except that the uncompliant terminal 14 is uncompliant with QoS.

The LAN control section 7 is comprised of a computer machine as a server to be connected to, for example, a wireless LAN base station and has an access point (parent) equipped with a capability of wireless LAN connection to the terminal 1 (including the uncompliant terminal 14) and a hub to which the access point is connected (hereinafter the access point and hub are generally called "access point/hub 6", a QoS manager section 8 (which constitutes the essential portions of the individual means of the LAN control apparatus in the wireless LAN system according to the invention and the corresponding steps) which manages the LAN setting and control including QoS setting and control, and a router 12 to be connected to the QoS manager section 8. The LAN control section 7 is connectable to an Internet 13 via the router 12. In addition to the router 12, a gateway can be provided in case where conversion to another communication protocol is needed besides the routing based on the IP address of a data packet.

Figure 2:
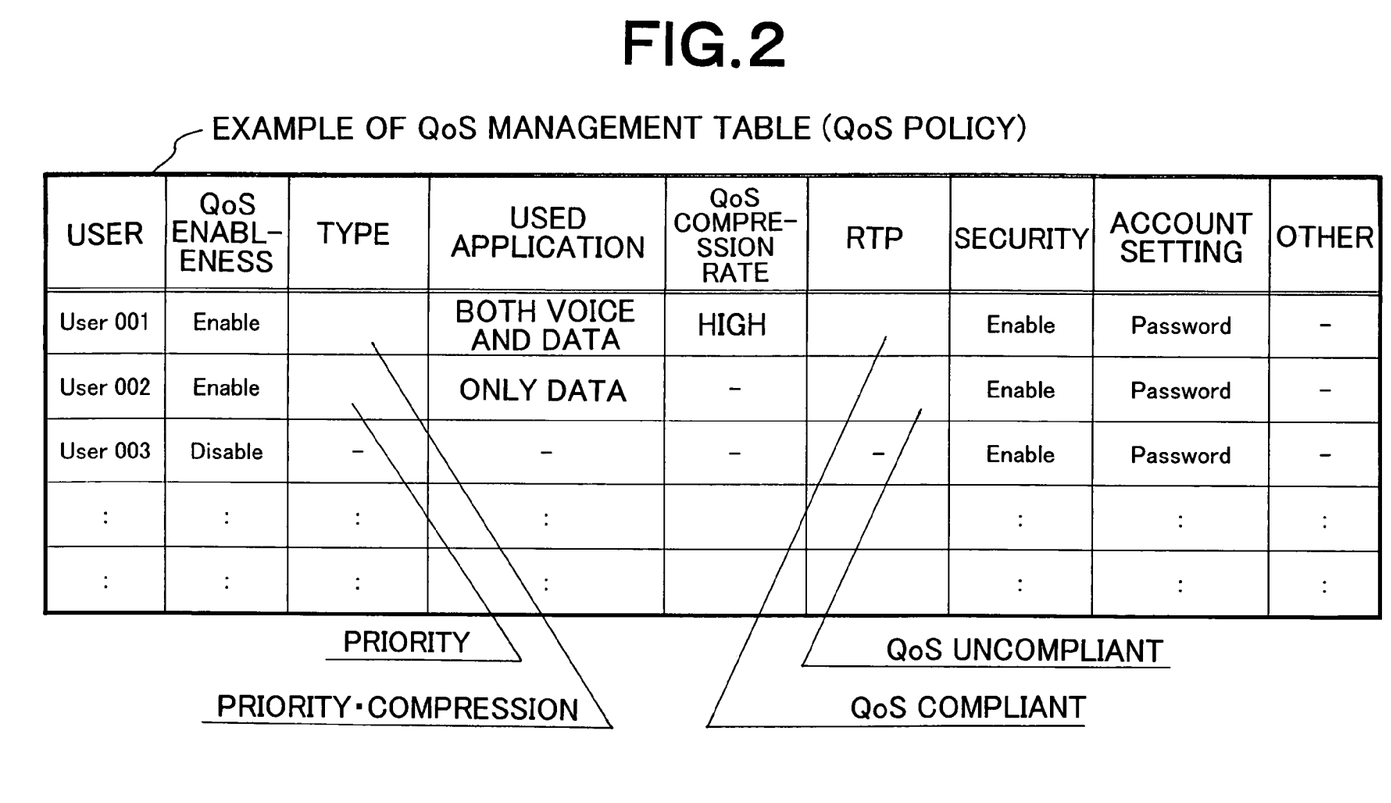
FIG. 2 is a diagram showing an example of settings in a QoS management table.

Of the mentioned components, the QoS manager section 8 is constituted by, for example, a microcomputer having a CPU and memory. The QoS manager section 8 has, as its functional structures, a QoS communication control section 9 (which constitutes the essential portions of the table transmission means, policy reconstruction means, QoS control means and spontaneous table distribution means of the invention) which performs QoS control on communication data with a terminal according to the invention a QoS policy to be discussed later, an ID manager section 10 which manages ID information or the like of a terminal to be connected to the LAN 5, and a QoS setting DB (Data Base) 11 (which constitutes the table holding means of the invention). Set in the QoS setting DB 11 is a QoS management table 11a as a QoS policy to be used in the QoS control on communication data with a terminal to be connected to the LAN 5. FIG. 2 shows an example of the QoS management table 11a.

Referring to FIG. 2, set in the QoS management table 11a in the QoS setting DB 11 are various kinds of data for each of the users of terminals connected to the LAN 5. Specifically, for each "User (terminal)", there are set "QoS enableness" (QoS setting being Enabled or Disable), "QoS type" (the type indicating, for example, whether a process to be executed in QoS control is priority/non-priority process or a compression process), "Used application" (which discriminates whether communication data is a voice or data or both (including the discrimination of an image, a moving picture and so forth as needed), "QoS compression rate" (the level, such as the low, intermediate or high compression rate of communication data in the compression process to be executed in QoS control), "RTP (Real Time Protocol)" (which discriminates whether RTP is compliant with QoS or uncompliant with QoS), "Security" or personal data (which discriminates whether the security setting is Enabled or Disabled), "Account setting" (information of a password to be used in account setting, and "Other". Those pieces of data are added and updated on the QoS management table 11a every time a new terminal is logged into the LAN 5.

Figure 3A:
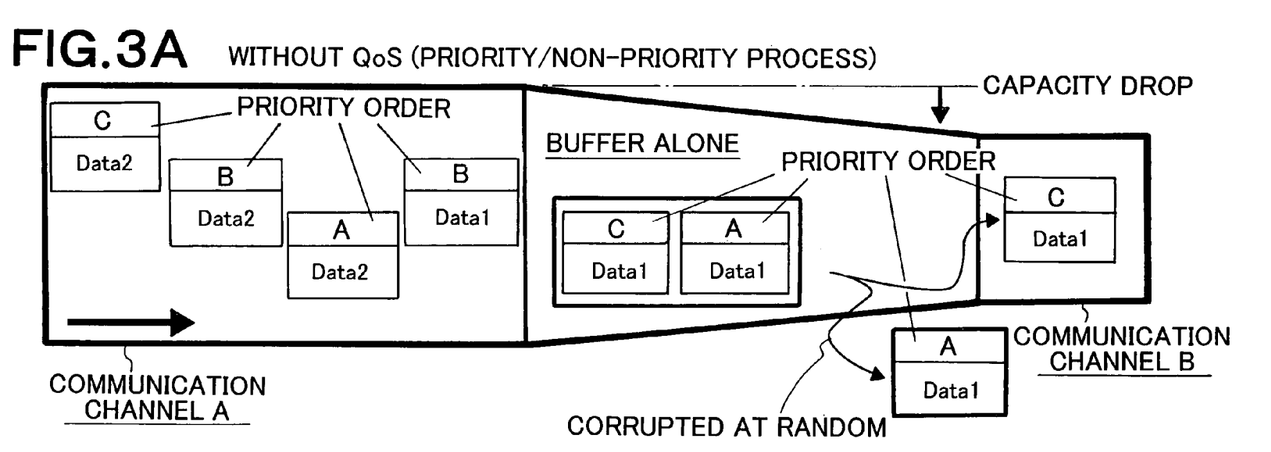
Figure 3B:
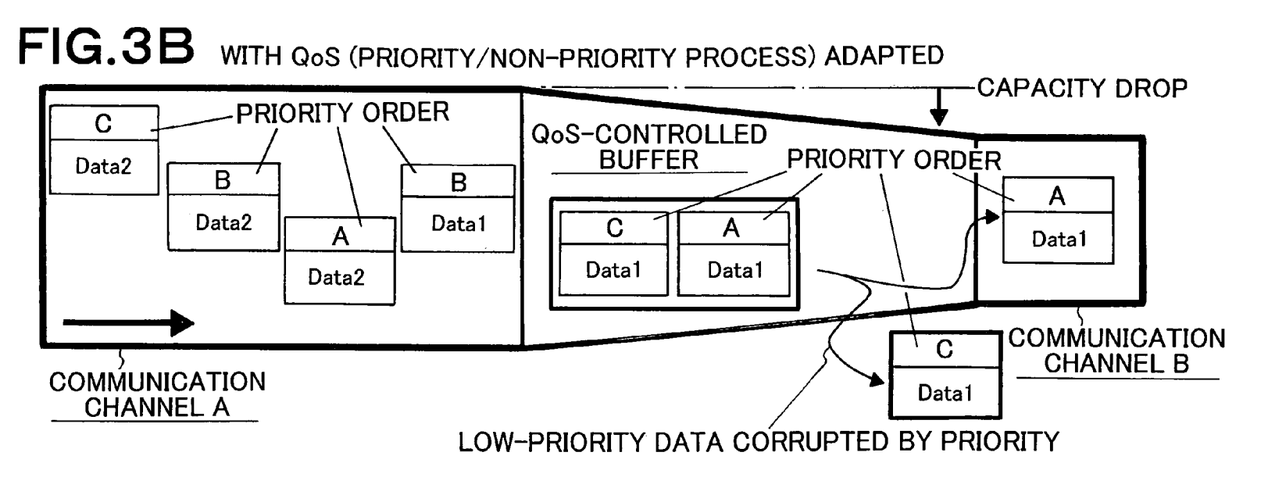

Referring now to FIGS. 3A and 3B, a description will be given of the priority/non-priority process on communication data which is executed by the QoS communication control section 9 according to the invention the QoS policy that is set (updated) in the above-described manner.

FIGS. 3A and 3B respectively illustrate a case where the priority/non-priority process is carried out under the QoS control (QoS service) and a case where the priority/non-priority process is not. Let us consider the case where communication data (Data 1, 2) or a data packet given a priority order (A, B or C in the descending) of QoS is sent from a communication channel A (e.g., a communication channel between a terminal and an access point) to a communication channel B (e.g., a communication channel between the access point and another communication network such as the Internet) with a lower communication capacity than the communication channel A via a buffer (not shown in FIG. 1) in the LAN control section 7.

FIG. 3A shows the case where the priority/non-priority process under the QoS control is not performed on the communication data. In this case, the communication data is discarded at random regardless of the priority order of A, B or C of the communication data to be stored in the buffer in the LAN control section 7 through the communication channel A. The example in the diagram exemplarily illustrates that, of individual pieces of data (Data 1) with the priority orders of A and C stored in the buffer, the data (Data 1) with the highest priority order A is discarded, while the data (Data 1) with the lowest priority order C is sent to the communication channel B.

FIG. 3B shows the case where the priority/non-priority process is performed on the communication data under the QoS control. In this case, data with a low priority order is discarded based on the priority order of A, B or C of the communication data to be stored in the QoS-controlled buffer in the LAN control section 7 through the communication channel A. The example in the diagram exemplarily illustrates that, of individual pieces of data (Data 1) with the priority orders of A and C stored in the QoS-controlled buffer, the data (Data 1) with the lowest priority order C is discarded, while the data (Data 1) with the highest priority order A is sent to the communication channel B.

The operation of the embodiment will be described referring to FIGS. 4 to 6.

Figure 4:
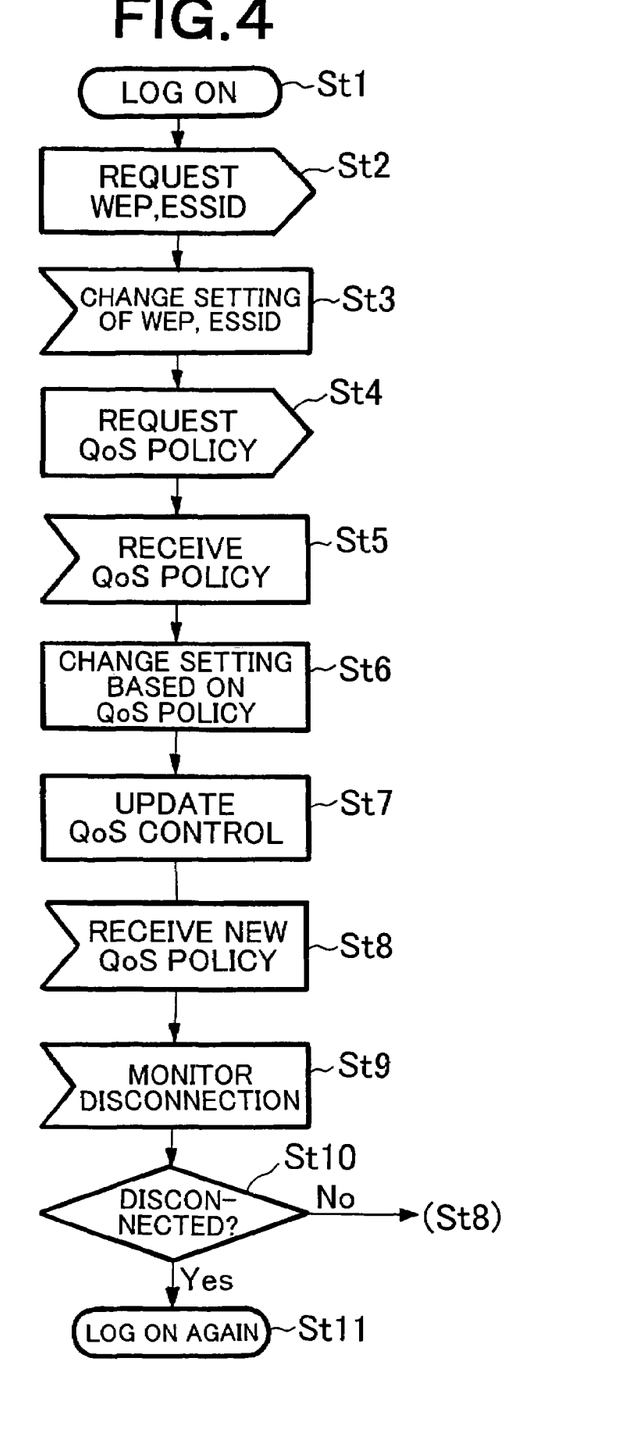
FIG. 4 is a schematic flowchart illustrating a process sequence which is carried out by a QoS analyzing/setting section of a terminal.
Figure 5:
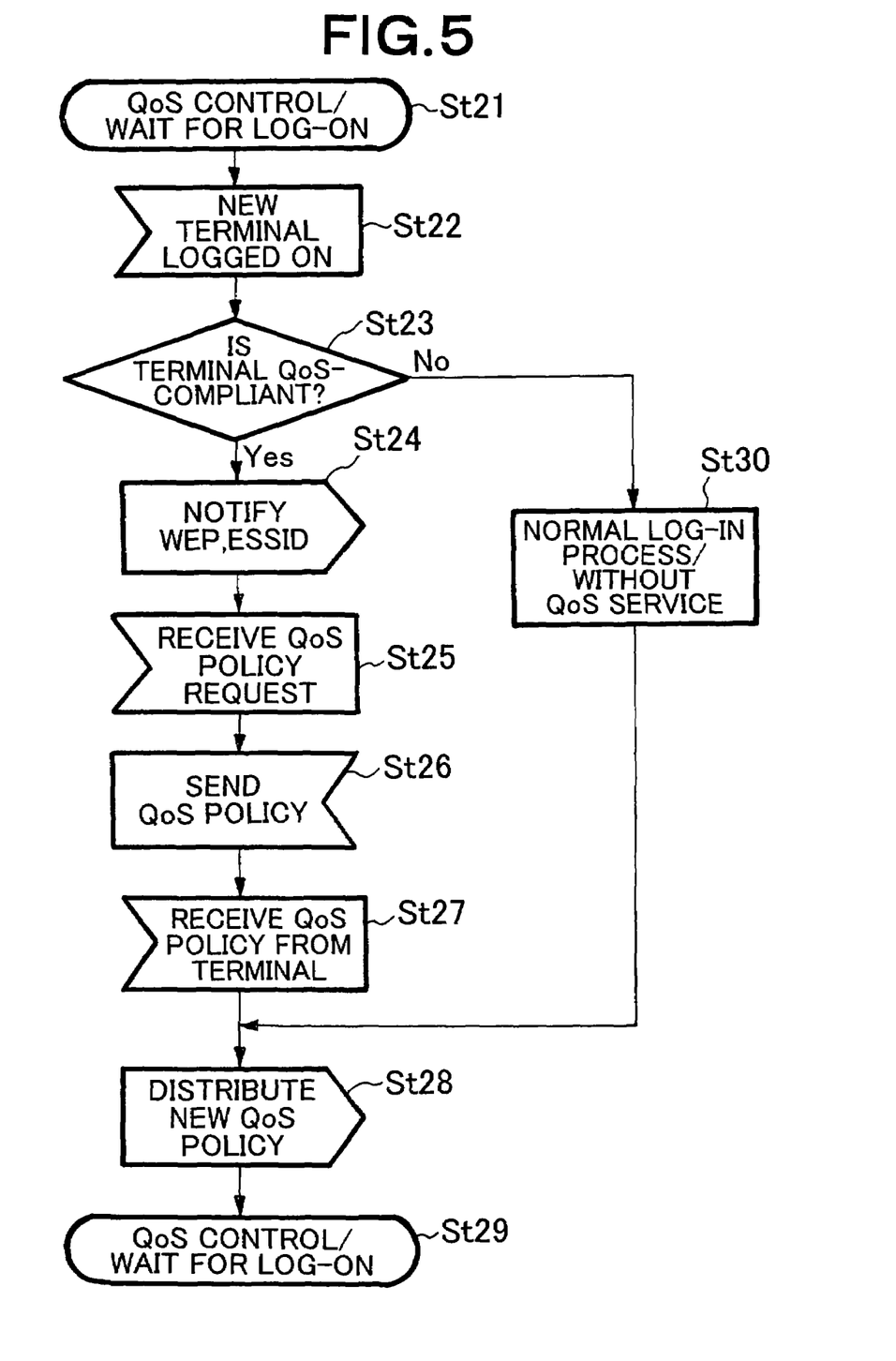
FIG. 5 is a schematic flowchart illustrating a process sequence which is carried out by a QoS manager section of a LAN control section.
Figure 6:
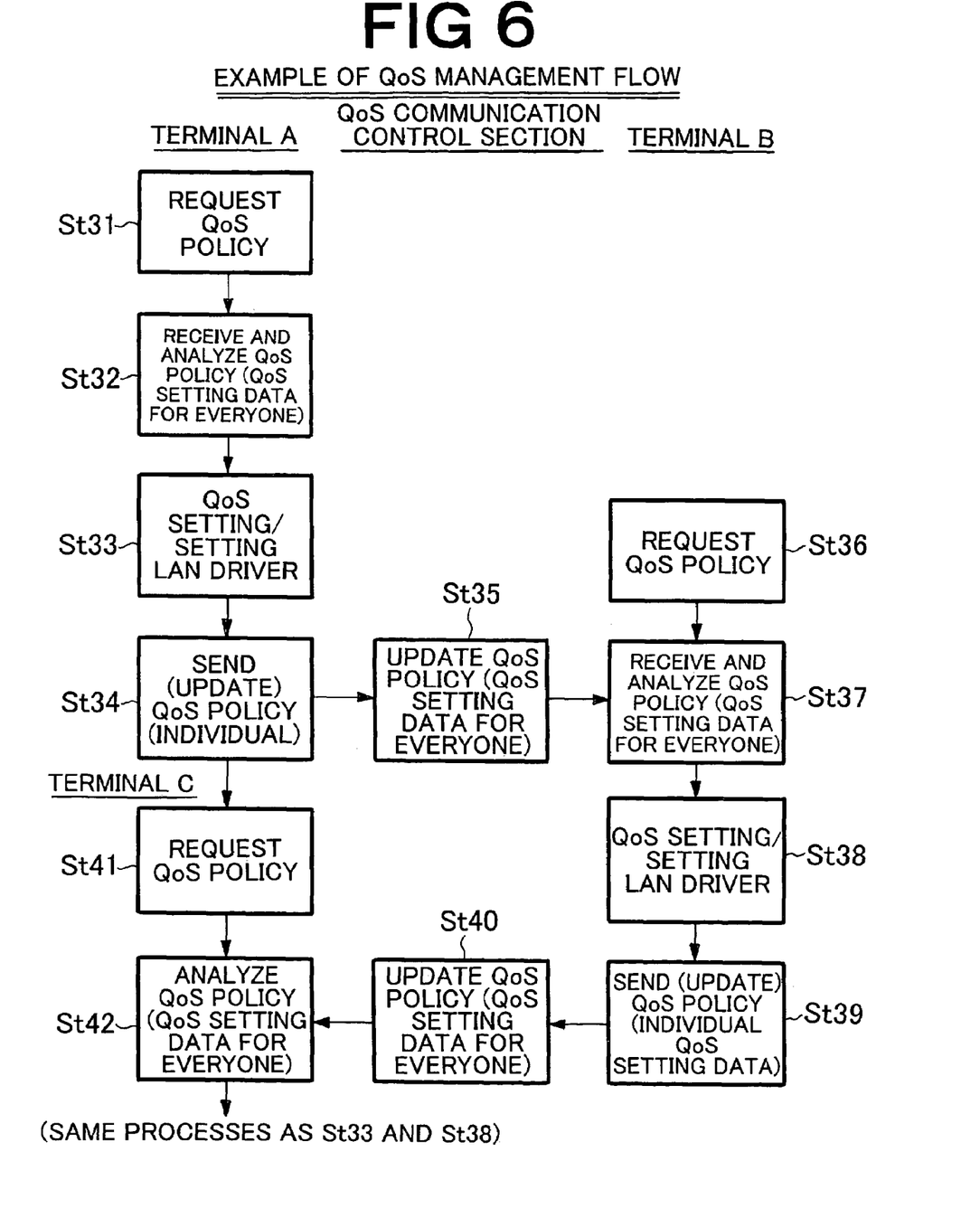
FIG. 6 is a schematic flowchart illustrating a QoS management flow which is carried out between a terminal and the LAN control section.

FIG. 4 shows an example of a process sequence which is carried out by the QoS analyzing/setting section 4 of the terminal 1, FIG. 5 shows an example of a process sequence which is carried out by the QoS manager section 8 (mainly the QoS communication control section 9) of the LAN control section 7 (server) and FIG. 6 shows an example of a QoS management flow which between the terminal 1 and the LAN control section 7.

To begin with, the process by the QoS analyzing/setting section 4 of the terminal 1 will be discussed.

In FIG. 4, first, at the time the terminal 1 logs onto the LAN 5, the terminal 1 notifies the LAN control section 7 of the connection (log-on) of the terminal 1 (step St1), and then requests notification of LAN setting, such as wireless setting (in this example, "WEP (Wired Equivalent Privacy)" and "ESSID (Extended Service Set IDentifier)" which are functions defined in IEEE802.11 and schemes, such as an encryption system) (Step St2). When information on WEP and ESSID is sent from the QoS manager section 8 based on management information in the ID manager section 10 and the latest updated information in the QoS setting DB 11 in response to the request, the QoS analyzing/setting section 4 receives the updated information and changes the settings of WEP and ESSID based on the received information (step St3).

Next, the QoS analyzing/setting section 4 requests of the QoS manager section 8 for a QoS policy (QoS management table 11*a*) (step St4). In response to the request, the QoS manager section 8 sends the QoS management table 11*a* based on the information in the ID manager section 10 and the latest updated information in the QoS setting DB 11 through the process executed by the QoS communication control section 9. The QoS management table 11*a* includes all QoS setting data for the users of other terminals connected to the LAN 5.

Upon reception of the QoS management table 11*a* (step St5), the QoS analyzing/setting section 4 analyzes the data in the table 11*a* by running a program based on a preset analysis algorithm for setting a predetermined QoS and sets the QoS setting data of the terminal 1 based on the result of the analysis (step St6).

As the analysis algorithm in this case, one which checks the mode (frequency distribution) of pieces of QoS setting data on other terminals on the QoS management table 11*a* and selects the QoS setting data that has the highest frequency from the pieces of QoS setting data is employed. There may be a case where data with the highest frequency cannot be set due to the functional restrictions (uncompliant with voice or the like) on the terminal 1. In this example, therefore, it is also possible to employ an algorithm which repeatedly determines whether or not QoS setting data with a higher frequency can be set on the terminal 1 one after another and selects the data that has been determined as being settable.

The reason why QoS setting data of the terminal 1 is set in accordance with data with the highest frequency is that the more uniform the QoS setting data of every user of the LAN 5 is, the higher the process efficiency of the QoS control becomes. A process of setting a QoS in accordance with a preset value (e.g., the priority order or the like) set beforehand on the terminal side may be employed as needed in addition to the analysis algorithm.

Then, after the QoS setting data set on the terminal 1 in the above-described manner is set in the LAN driver 2 and wireless LAN card 3, the QoS setting data is sent to the QoS manager section 8 to update the QoS management table 11*a* in the QoS setting DB 11 and update QoS control method (QoS service) based on the table 11*a* (step St7).

Thereafter, every time a new terminal is logged into the LAN 5 and added, the QoS analyzing/setting section 4 receives a new QoS policy (updated data in the QoS management table 11*a*) which is spontaneously distributed to all the terminals from the QoS manager section 8 (step St8), and changes the QoS setting data based on the new QoS policy (please refer to the later description for this process).

Then, disconnection from the LAN 5 is monitored (step St9), and if disconnection occurs, re-connection (re-log-on) is carried out (steps St10 and St11).

The process carried out by the QoS manager section 8 of the LAN control section 7 will be described.

Referring to FIG. 5, first, when the QoS manager section 8 acknowledges a new connection (log-on) established from the standby state through notification from a terminal (steps St21 and St22), the QoS manager section 8 checks if the terminal is uncompliant with QoS (step St23).

In case where it is determined in the process of the step St23 that the terminal is compliant with QoS (the terminal 1 in the example of FIG. 1), the QoS communication control section 9 notifies the WEP and ESSID based on the ID information in the ID manager section 10 and the information in the QoS setting DB 11 (step St24).

Subsequently, upon reception of a request for a QoS policy from the terminal (step St25), the QoS manager section 8 sends the QoS policy stored in the QoS setting DB 11 or the QoS management table 11*a* in response to the request (step St26).

Then, the QoS manager section 8 receives QoS setting data from the terminal (data set based on the QoS management table 11*a*) (step St27), and updates the QoS management table 11*a* in the QoS setting DB 11 based on the data to reconstruct (revise) the general QoS policy of the LAN 5 and spontaneously distributes the QoS management table 11*a* as the reconstructed new QoS policy to all the terminals on the LAN 5 (step St28). Thereafter, the QoS manager section 8 waits for log-on from a new terminal while keeping executing the QoS control (QoS service) based on the revised new QoS policy or the updated QoS management table 11*a* (step St29).

In case where it is determined in the process of the step St13 that the terminal is uncompliant with QoS (the uncompliant terminal 14 in the example of FIG. 1), on the other hand, the normal log-in (log-on) process is executed (step St30). In this case, the QoS service is not applied. In this case, the QoS manager section 8 also sets (updates) the QoS management table 11a in the QoS setting DB 11 to reconstruct (revise) the general QoS policy of the LAN 5 and spontaneously distributes the QoS management table 11a as the reconstructed new QoS policy to all the terminals on the LAN 5 (step St28). Thereafter, the QoS manager section 8 waits for log-on from a new terminal while keeping executing the QoS control (QoS service) based on the revised new QoS policy (step St29).

In case where a terminal which has no consideration on a QoS (uncompliant terminal 14) is added newly, for example, the QoS setting data is updated based on the redistributed new QoS policy in such a way that every terminal (every user) increases the compression rate of communication data by a predetermined level from the current level. While this increases the overall load on the system, it is possible to save an uncompliant terminal and keep the voice qualities of all the terminals at a specific level. To maintain the real-time property of communication data, it is preferable that the compression rate should normally be set to or below a given level. In this case, it is possible to make the setting in such a way as to restrict the band of a terminal which is uncompliant with a QoS or in such a way as not to perform a cooperative operation with regard to a QoS with another terminal.

In case where a terminal which has is compliant with a QoS is added newly, the compatibility between both can be guaranteed if information on whether or not QoS control in the RTP can be coped with (QoS compliant/uncompliant) is registered in the QoS policy.

The cooperative operation of updating QoS setting data between the QoS analyzing/setting section 4 of the terminal 1 and the QoS manager section 8 of the LAN control section 7, as needed, according to another terminal newly added to the LAN 5 is carried out in the above-described manner.

One example of the cooperative operation between the terminal 1 and the LAN control section 7 will be discussed referring to the QoS management flow illustrated in FIG. 6. In the example o FIG. 6, terminals A, B and C are exemplified as the terminal 1 compliant with a QoS.

In FIG. 6, the terminal A performs various processes as done in the process sequence (steps St1 to St11) shown in FIG. 3. Specifically, through the process executed by the QoS analyzing/setting section 4, the terminal A requests a QoS policy (step St31), receives a QoS policy (for every user: QoS setting data of all the terminals connected to the LAN 5) sent from the LAN control section 7 in response to the request and analyzes the QoS policy by running the program based on the aforementioned analysis algorithm (step St32), sets its own QoS based on the result of the analysis and sets the set data in the LAN driver 2 (specifically, an unillustrated QoS wireless driver) (step St33), and sends the set QoS policy (individual policy: QoS setting data of terminal A) to the LAN control section 7 (step St34).

In response to the transmission of the QoS policy, the QoS manager section 8 updates the QoS policies in the QoS setting DB 11 (for all the users: the QoS management table 11a) based on the QoS policy sent from the terminal A (individual policy: QoS setting data of terminal A) through the process carried out by the QoS communication control section 9 (step St35).

Thereafter, like the terminal A, through the process executed by the QoS analyzing/setting section 4, the terminal B executes various processes of requesting a QoS policy (step St36), receiving QoS policies (for all the users: QoS setting data of all the terminals, inclusive of the terminal A, connected to the LAN 5) updated by the terminal A at that time and analyzing the QoS policies by running the program based on the aforementioned analysis algorithm (step St37), setting the QoS based on the result of the analysis and setting the set data in the LAN driver 2 (step St38), and sending the set QoS policy (individual policy: QoS setting data of terminal B) (step St39).

Accordingly, the QoS communication control section 9 updates the QoS policies in the QoS setting DB 11 (for all the users: the QoS management table 11a) based on the QoS policy sent from the terminal B (individual policy: QoS setting data of terminal B) (step St40).

Thereafter, like the terminals A and B, through the process executed by the QoS analyzing/setting section 4, the terminal C also requests a QoS policy (step St41), receives QoS policies (for all the users: QoS setting data of all the terminals, inclusive of the terminals A and B, connected to the LAN 5) updated by the terminal B at that time and analyzes the QoS policies by running the program based on the aforementioned analysis algorithm (step St42), and thereafter performs the same processes as discussed above to update the QoS policies in the QoS setting DB 11 (QoS management table 11a) based on the QoS policy sent from the terminal C.

As apparent from the above, harmonious QoS control can be realized by optimizing local QoS control and doing QoS setting on the terminal A according to the QoS policies (QoS management table 11a or QoS setting data of other users) stored in the QoS setting DB 11, allowing terminals B and C which will additionally log into the LAN 5 later use the information. In this case, the QoS communication control section 9 can instruct all the terminals A, B and C around to set the QoS again as needed.

The QoS control can be made more reliably by grasping the QoS control systems and settings of other terminals than the local one and setting the QoS setting of the local terminal in accordance with the QoS settings of the other terminals. In case where even a single QoS-uncompliant terminal logs in, all the terminals (all the users) can change their QoS settings again accordingly, thus minimizing the influence of the uncompliant terminal.

According to the embodiment, therefore, as the QoS manager section on the LAN control section distributes the QoS policy to all the subordinate terminals for each LAN, even a terminal which has logged onto the LAN for the first time can acquire the QoS setting of that one of the other terminals which best matches with the environment (e.g., the QoS setting with the highest frequency) and thus can alter its own QoS setting in accordance with the acquired QoS setting.

According to the embodiment, even in case where, for example, a business person who mainly works in suburbs always carries around a business terminal and uses an office LAN when returning to the office, a domestic LAN in a home and various LAN environments, such as Hotspots, in the fields, the business person can always receive the optimal QoS service without being conscious about the QoS setting of the local LAN as the local terminal gets the adequate QoS setting and network setting, through the QoS policy, from among those for a home, an office and countless Hotspots which would differ from one another.

That is, according to the embodiment, the LAN control section is equipped with the QoS manager section which manages LAN setting including the QoS setting for each of dotted LANs like Hotspots, and can exchange a QoS policy (QoS management table) with a terminal, so that a terminal which moves among various LANs can have the following advantages.

Even if the terminal moves to a LAN having a different QoS policy, for example, the QoS analyzing/setting section of the terminal detects that the terminal has moved to a LAN having a different QoS policy and gets a QoS policy from the QoS manager section of the LAN control section connected to that LAN, thus ensuring automatic acquisition of the optimal QoS setting (e.g., the QoS setting with the highest frequency) even for a LAN onto which the terminal has logged for the first time. In other words, necessary QoS setting can be acquired easily even under a new QoS environment which has not been registered previously.

As the QoS analyzing/setting section analyzes the QoS policy which is created by the QoS manager section based on information in the ID manager section and the QoS setting DB, adequate one is automatically selected (automatically switched) from different QoS settings for different LANs, such as a home, an office and countless Hotspots. This can eliminate the need for manual setting by a user.

The QoS analyzing/setting section can automatically select or switch adequate security setting account setting from those different for different LANs, such as a home, an office and countless Hotspots. This can eliminate the need for manual setting by a user.

The present invention is not limited to the above-described embodiment which has been illustrated as a typified example, and it should be apparent to those skilled in the art that the invention may be altered and modified in many other specific forms based on the descriptions of the appended claims without departing from the spirit or scope of the invention. Those alterations and modifications are to be considered as inclusive to the scope of the invention.

According to the invention, as described above, the LAN control apparatus distributes a QoS management table 11a as a QoS policy to a terminal, so that a terminal which has logged onto a LAN for the first time can get the adequate QoS setting that matches best with a desired one of various LAN environments, such as a home, an office and Hotspots. This can allow the terminal to automatically set the QoS and can thus provide a wireless LAN system which can overcome a troublesome operation and process of setting QoS needed for each LAN even in case where such various LAN environments are used.

What is claimed is:

1. A wireless LAN (Local Area Network) system comprising:
   a communication terminal connectable to a wireless LAN; and
   a LAN control apparatus to be connected to said communication terminal via said wireless LAN in such a manner as to be able to exchange communication data with said communication terminals, wherein said communication terminal including
   policy request means which requests of said LAN control apparatus for a QoS (Quality of Service) management table as a QoS policy to manage QoS of said communication data at a time of establishing connection to said wireless LAN,
   analyzing/setting means which analyzes said QoS management table sent from said LAN control apparatus in response to a request made by said policy request means and sets QoS setting data of said communication terminal in an updatable manner based on a result of that analysis, and
   setting-data transmission means which sends said QoS setting data, set by said analyzing/setting means, to said LAN control apparatus, and
   said LAN control apparatus including
   table holding means which holds said QoS management table in an updatable manner,
   table transmission means which sends said QoS management table in response to said request from said communication terminal,
   policy reconstruction means which updates said QoS setting data, sent from said communication terminal, on said QoS management table to reconstruct said QoS policy, and
   QoS control means which executes QoS control on said communication data with said communication terminal in accordance with said QoS policy which is determined by said QoS management table.

2. The wireless LAN system according to claim 1, wherein said LAN control apparatus further includes means which spontaneously distributes said QoS management table as said reconstructed QoS policy to every communication terminal connected to said wireless LAN, and
   said communication terminal further includes means which changes said QoS setting data, set by said analyzing/setting means, based on said QoS management table spontaneously distributed from said LAN control apparatus.

3. A LAN (Local Area Network) control apparatus in a wireless LAN system, which is connected to a communication terminal via a wireless LAN in such a manner as to be able to exchange communication data with said communication terminal, comprising:
   table holding means which holds a QoS (Quality of Service) management table in an updatable manner as a QoS policy to manage QoS of said communication data;
   table transmission means which sends said QoS management table in response to a request from said communication terminal;
   policy reconstruction means which updates QoS setting data, sent from said communication terminal in response to said table transmission means and set through analysis on said QoS management table, to reconstruct said QoS policy; and
   QoS control means which executes QoS control on said communication data with said communication terminal in accordance with said QoS policy which is determined by said QoS management table.

4. The LAN control apparatus according to claim 3, further comprising
   means which spontaneously distributes said QoS management table as said reconstructed QoS policy to every communication terminal connected to said wireless LAN.

5. A QoS (Quality of Service) control method for a wireless LAN (Local Area Network) system having a communication terminal connectable to a wireless LAN and a LAN control apparatus to be connected to said communication terminal via said wireless LAN in such a manner as to be able to exchange communication data with said communication terminal, said method comprising the steps of:
   causing said LAN control apparatus to hold a QoS management table in an updatable manner as a QoS policy to manage QoS of said communication data;
   causing said communication terminal to request of said LAN control apparatus for said QoS management table at a time of establishing connection to said wireless LAN;
   causing said LAN control apparatus to send said QoS management table in response to a request from said communication terminal;

causing said communication terminal to analyze said QoS management table sent from said LAN control apparatus in response to said request and set QoS setting data of said communication terminal in an updatable manner based on a result of that analysis;

causing said communication terminal to send said set QoS setting data to said LAN control apparatus;

causing said LAN control apparatus to update said QoS setting data, sent from said communication terminal, on said QoS management table to reconstruct said QoS policy; and causing said LAN control apparatus to execute QoS control on said communication data with said communication terminal in accordance with said QoS policy which is determined by said QoS management table.

6. The QoS control method according to claim 5, further comprising the steps of:

causing said LAN control apparatus to spontaneously distribute said QoS management table as said reconstructed QoS policy to every communication terminal connected to said wireless LAN; and causing said communication terminal to change said QoS setting data based on said QoS management table spontaneously distributed from said LAN control apparatus.

* * * * *